Jan. 2, 1923.　　　　　　　　　　　　　　　　　　　1,440,854
J. B. J. A. VIGNERON.
TRAWLING GEAR FOR DEEP SEA FISHING.
FILED MAR. 8, 1921.
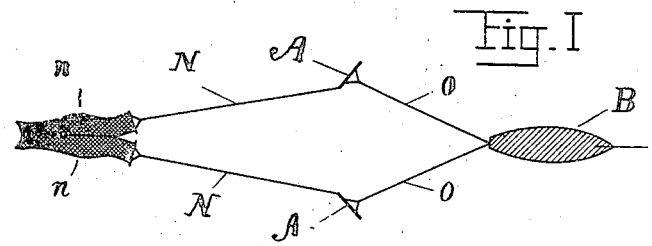
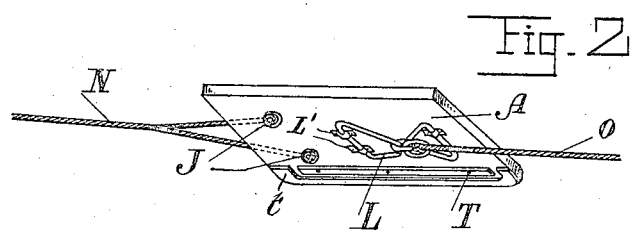
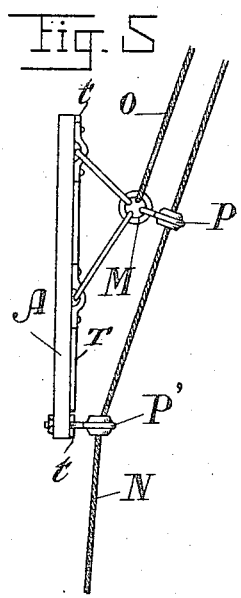
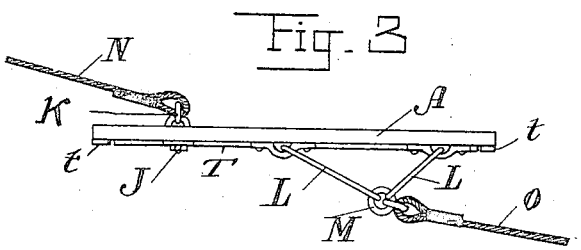
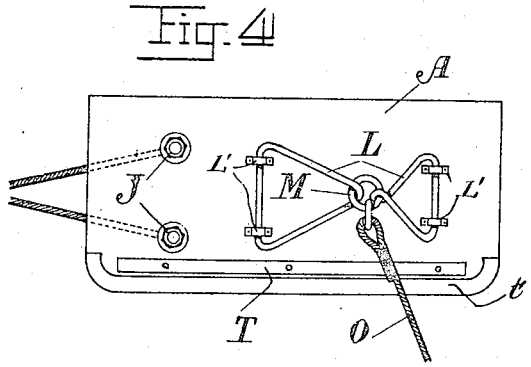
INVENTOR;
Jean B. J. A. Vigneron
By Wm Wallace White
ATTY.

Patented Jan. 2, 1923.

1,440,854

UNITED STATES PATENT OFFICE.

JEAN BAPTISTE JOSEPH ALPHONSE VIGNERON, OF MARSEILLE, FRANCE.

TRAWLING GEAR FOR DEEP-SEA FISHING.

Application filed March 8, 1921. Serial No. 450,526.

*To all whom it may concern:*

Be it known that I, JEAN BAPTISTE JOSEPH ALPHONSE VIGNERON, citizen of the Republic of France, residing at Marseille, France, have invented new and useful Improvements in and Relating to Trawling Gear for Deep-Sea Fishing, of which the following is a specification.

The present invention relates to improvements in fishing apparatus, more particularly to that form thereof known as trawling gear, the object of the invention being to provide an apparatus of this character in which the so-called "boeuf" and "gangui" apparatus are combined in such a manner that a single boat may be used for towing the net.

A further object of the improvements is to provide an apparatus in which the operating elements are so positioned that the apparatus is caused to operate with greatly reduced tractive effort, and in which the action of the panels is caused to assist in bringing the fish into the net.

With the foregoing and other objects in view, the invention consists in the novel features of construction and combination of parts which will be more fully described hereinafter and particularly pointed out in the claims.

In the drawings accompanying and forming part of this specification,

Fig. 1 is a diagrammatic view illustrating the general arrangement of the apparatus;

Fig. 2 is a perspective view of one of the panels or boards, illustrating the method of attaching the same to the net and to the boat by which it is to be towed;

Fig. 3 is a plan or edge view of the panel shown in Fig. 2;

Fig. 4 is a side elevation of said panel; and

Fig. 5 is an edge view of a similar panel, but illustrating a form of connecting the panel for fishing at greater depth.

The same characters of reference designate the same parts in the different figures of the drawing.

Referring to the drawings, and particularly to Fig. 1, the apparatus comprises a net, the wings of which are indicated at $n$, the two panels A being shown connected respectively to said wings on the one hand, by lines N, and to the boat B on the other hand by cables O.

As shown in the practical embodiment illustrated in Figs. 2, 3, and 4, the panels are provided with what may be termed bridles L for connection with the towing cable or hawser O, the bridles being connected together by means of a ring M. The bridles are shown herein as comprising a pair of triangular members or bails L, one leg of each of which is pivotally secured to the panel by means of a pair of straps or brackets L', the difference between the pivotal points of the respective members being such that if said members were permitted to lie parallel with the panel they would overlap each other. Therefore, by connecting the members at their apices, as shown in the drawing, they are caused to stand out at an angle to the panel. The line N which secures the panel to the net is attached to the panel, not at the rear edge of the panel as in the panels of the apparatus known as the "Otter Trawl", but by means of two branches secured to rings K, which are connected to the panel by means of fastening members J, the rings K, being, as shown in Figs. 2, 3, and 4, located at the side of the panel opposite from the bridles L. The effect of this disposition is to render the panel more stable both when being placed in the water and while trawling. The connecting rings M permit the bridles L, as well as the shackle for attaching the cable O thereto, a certain amount of play thereby to enable the panel to take its own inclination according to the length of the hawsers and the speed of travel.

In Figs. 2 and 4, the panel is shown provided with supplementary removable means for weighting the same, it being understood that the panels must be weighted or ballasted differently according to the depth at which they are to be operated, and for this purpose they are provided with the following arrangement.

Directly above the ordinary weighting band $t$, the panel has three holes formed therein enabling bands T of iron or cast metal by which it is intended to obtain the necessary weight, to be secured by means of bolts and nuts, on one or both sides of the board.

Fig. 5 shows the ultimate or working arrangement of guides for paying out the hawsers. In trawling the fishing is more successful according as the length of the hawser dragging on the bottom of the sea between the panels and the net, is increased. On the other hand however with the increase of this length the difficulty of placing the apparatus in the water without fouling the hawsers is increased.

Furthermore, at greater depths the panels being heavier than the net, reach the bottom before the latter which on account of its lower density takes considerable time before it touches the bottom of the sea.

It is in order to avoid these two disadvantages that the following arrangement has been designed.

The panels are provided at P P', with two grommets or rings of wood, the grommet P' being connected to the panel by means of an eye member $p$ which encircles said grommet and is provided with a threaded stem that passes through the panel and is secured thereto by a nut $p'$. They are connected to the boat by the hawser attached as hereinbefore stated, but the net instead of being connected to the panels by a hawser, is connected to the boat by a hawser which passes through the grommets P and P' and this forms a duplicate to the hawser going from the panel to the ship.

The apparatus is placed in the water with the panels placed on the net. As soon as the net is at the bottom of the water, in the position for fishing, the hawsers O connecting the panels with the boat do not require to be further adjusted, but the hawsers connecting the net to the boat continues to be paid out. Owing to the latter sliding through the grommets P, P', the net actually moves away a little from the panels and takes up its normal position relatively thereto. The control of the hawsers may be ensured by certain marks, such for example as threads of red color woven into the cord at regular predetermined intervals.

The operation of the device is as follows: The net is immersed in the water from the side of the boat, the latter being preferably placed with its length perpendicular to the direction of the wind. Operating in this manner, the net stretches itself evenly in the water, while the boat at the same time drifts away from the net. The cables connecting the net to the panels are then paid out. The panels are in due course immersed and then the boat is started at a low speed, the cables connecting the panels to the boat being in the meantime paid out. The panels thus diverge under the influence of the resistance offered by the water. When the panels have reached the bottom, the speed of the boat is increased to normal.

When the structure shown in Fig. 5 is used, the panels are immersed immediately after the net, the boat proceeding at a very low speed, and as soon as the net lies stretched on the bottom the cable N of the net is paid out, while the cable O is held taut until the net and panel are at their proper distance apart, whereupon both cables are paid out at the same rate of speed.

From the foregoing description, it will be obvious that the panels of this apparatus do not require to be at a distance apart which must be so strictly maintained as with the so-called otter trawl, so that there is a considerable saving of coal in the operation of the boat as well as less wear on its machinery. Furthermore, to the well-known action of the hawsers, which, by raising the mud, have the effect of bringing the fish down and into the net, there is added the similar action of the panels, which considerably increases the clouds of mud raised. There is no disadvantage in the panels becoming muddy, because, owing to the distance they are located away from the net, they cannot cause the net to become muddy, and the apparatus may therefore operate on very muddy bottoms without disadvantage. Another advantage of the present apparatus is that it may be employed just as well in a submerged condition as on the surface, because of the herein described method of adjusting the weights or ballast of the panels.

Having thus described my invention, what I claim is:

1. A fishing apparatus, comprising, in combination, a net, a boat, a pair of panels, and means connecting the panels to the boat and net, said panels being disposed remote from the net a distance sufficient to cause a predetermined length of the connecting means to drag on the bottom of the fishing area, the connections between the boat and the panels and between said panels and the net being such that the panels are caused to assume a direction at an angle to the direction of travel of the boat.

2. A fishing apparatus, comprising, in combination, a net, a boat, a pair of panels and means connecting the panels to said net and boat, said panels being located remote from the net a distance sufficient to cause a predetermined length of the connecting means to lie at the bottom of the fishing area, said panels having at one side thereof a pair of bridles connected together by a closed ring for attachment of the boat connection.

3. A fishing apparatus, comprising, in combination, a net, a boat, a pair of panels and means connecting the panels to said net and boat, said panels being located remote from the net a distance sufficient to cause a predetermined length of the connecting means to lie at the bottom of the fishing area, the connections being such that the panels are caused to assume a direction at an angle to the direction of travel of the boat, and removable means for adding weight to said panels.

4. A fishing apparatus, comprising, in combination, a net, a boat, a pair of panels, means connecting the panels to said boat, and means for connecting the net to the boat whereby the distance between the boat and the net may be increased without increasing the distance between the boat and the panels, said net-connecting means also displaceably connecting the panels to the net.

In testimony whereof I have signed my name to this specification.

JEAN BAPTISTE JOSEPH ALPHONSE VIGNERON.

Witnesses:
 EUGENE DUCASSON,
 EIENNE ROMA.